(12) United States Patent
Zhou et al.

(10) Patent No.: US 9,193,901 B2
(45) Date of Patent: Nov. 24, 2015

(54) METAL NANOPARTICLE-COATING SILICATE LUMINESCENT MATERIAL AND PREPARATION METHOD THEREFOR

(75) Inventors: Mingjie Zhou, Guangdong (CN); Rong Wang, Guangdong (CN); Guitang Chen, Guangdong (CN)

(73) Assignees: Ocean's King Lighting Science & Technology Co., Ltd., Guangdong (CN); Shenzhen Ocean's King Lighting Engineering Co., Ltd, Guangdong (CN)

( * ) Notice: Subject to any disclaimer, the term of this patent is extended or adjusted under 35 U.S.C. 154(b) by 0 days.

(21) Appl. No.: 14/397,925

(22) PCT Filed: May 8, 2012

(86) PCT No.: PCT/CN2012/075207
§ 371 (c)(1),
(2), (4) Date: Oct. 30, 2014

(87) PCT Pub. No.: WO2013/166663
PCT Pub. Date: Nov. 14, 2013

(65) Prior Publication Data
US 2015/0129802 A1  May 14, 2015

(51) Int. Cl.
*C09K 11/02* (2006.01)
*C09K 11/77* (2006.01)

(52) U.S. Cl.
CPC .............. *C09K 11/025* (2013.01); *C09K 11/02* (2013.01); *C09K 11/7749* (2013.01)

(58) Field of Classification Search
CPC ...... C09K 11/08; C09K 11/02; C09K 11/025; C09K 11/7706; C09K 11/7721; C09K 11/7734; C09K 11/7774; C09K 11/7749; B82Y 10/00; B82Y 20/00
USPC ............... 252/301.4 F, 301.4 R; 427/157
See application file for complete search history.

(56) References Cited

U.S. PATENT DOCUMENTS

2009/0189514 A1* 7/2009 Hiramatsu et al. ............ 313/503

FOREIGN PATENT DOCUMENTS

CN    102337121 A    2/2012

OTHER PUBLICATIONS

Wang et al., "Monodisperse spherical core-shell structured phosphors obtained by functionalization of silica spheres with Y2O3:Eu3+ layers for field emission displays", 2005, Applied Physics Letters, 87, pp. 181907-1 to 181907-3.*

(Continued)

*Primary Examiner* — Matthew E Hoban
*Assistant Examiner* — Lynne Edmondson
(74) *Attorney, Agent, or Firm* — Renner, Otto, Boisselle & Sklar, LLP

(57) ABSTRACT

Disclosed is a metal nanoparticle-coating silicate luminescent material, which has a molecular formula of $Li_2Ca_{1-x}SiO_4:Tb_x@M_y$; where @ represents a coating, M is at least one among Ag, Au, Pt, Pd, and Cu nanoparticles, where $0<x\leq 0.2$, where y is the molar ratio between M and Si, and where $0<y\leq 1\times 10^{-2}$. The composition of the silicate coated metal nanoparticle luminescent material is metal nanoparticles coated with $Li_2Ca_{1-x}SiO_4:Tb_x$, all of which are substances having great chemical stability and having great stability when bombarded by large electron beams. Also provided in the present invention is a method for preparing the metal nanoparticle coating silicate luminescent material.

10 Claims, 1 Drawing Sheet

(56) References Cited

OTHER PUBLICATIONS

Yu et al., "Silica Spheres Coated With YVO4:Eu3+ Layers via Sol-Gel Process: A Simple Method to Obtain Spherical Core-Shell Phosphors", 2005, Chem. Mater. 17, pp. 1783-1791.*

Zhong et al., "Enhanced emission from Li2CaSiO4:Eu2+ by doping with Y3+", 2014, Journal of Alloys and Compounds, 592, pp. 213-219.*

Liu et al., "Synthesis and characterization of novel blue emitting Na2CaSiO4:Ce3+", 2014, J Sol-Gel Sci Technol, 71, pp. 276-282.*

International Search Report for corresponding International Application No. PCT/CN2012/075207 mailed Jan. 17, 2013.

Zhuo et al., Synthesize and Luminescence Properties of Na2CaSiO4:Re3+(Re=Ce3+,Tb3+,Eu3+), Chinese Journal of Luminescence, vol. 33, No. 3, Mar. 2012, pp. 238-242.

* cited by examiner

METAL NANOPARTICLE-COATING SILICATE LUMINESCENT MATERIAL AND PREPARATION METHOD THEREFOR

TECHNICAL FIELD

The present invention relates to the field of luminescent material, in particular to a silicate coated metal nanoparticle luminescent material and preparation method therefor.

BACKGROUND ART

1960s, Ken Shoulder proposed the idea of the field emission cathode arrays (FEAs)-based electron beam micro-device, so study of the manufacture of flat panel displays and light source device utilizing the design of FEAs has aroused great interest in the public. The working principle of this brand new field emission device is similar to that of the conventional cathode ray tube (CRT), in which imaging or illuminating is achieved by the luminescent effect caused by bombardment of electron beam onto the red, green and blue-phosphor, such devices have potential advantages in terms of their brightness, viewing angle, response time, range of working temperature and power consumption, etc.

One of the key factors in the preparation of high-performance field emission device is the production of a high-performance phosphor body. Fluorescent materials being commonly employed by traditional field emission devices are mainly those sulfide-based and sulfur oxide-based phosphor for the traditional cathode-ray tube and projection television display tube.

The sulfide-based and sulfur oxide-based phosphor, exhibits relatively high luminance, and has a certain level of conductivity, but is prone to decomposition when bombarded by a large electron beam, which results in the release of elemental sulfur that "poisons" the cathode tip, and generation of additional deposition covering the surface of the phosphor, which reduces the luminous efficiency of the phosphor, and hence the service life of the field emission device is reduced.

DISCLOSURE OF THE INVENTION

On this basis, for the instability problem of the traditional sulfide-based and sulfur oxide-based phosphor when bombarded by large electron beams, it is necessary to provide a silicate coated metal nanoparticle luminescent material having greater stability when bombarded by large electron beams, and also a preparation method thereof.

A luminescent material having the formula of $Li_2Ca_{1-x}SiO_4:Tb_x@M_y$;

where, @ represents a coating, M is a metal nanoparticle core and is at least one of Ag, Au, Pt, Pd and Cu, $0<x\leq0.2$, y is the molar ratio of M and Si, and $0<y\leq1\times10^{-2}$.

A method of preparing a luminescent material, comprising the steps of:

preparing a colloid containing a metal nanoparticle (M), said metal nanoparticle is at least one of Ag, Au, Pt, Pd and Cu;

surface processing said colloid containing a metal nanoparticle, then adding anhydrous ethanol, deionized water and ammonia, mixing evenly and while stirring, adding tetraethylorthosilicate on the basis of the molar ratio, y, of M and Si, wherein $0<y\leq1\times10^{-2}$ and reacting the same to produce $SiO_2@M_y$ powder which is separated from the mixture;

weighing, on the basis of the stoichiometric ratio, the compounds corresponding to Li, Ca and Tb, and $SiO_2@M_y$, mixing evenly, thermally processing the mixture, and subjecting the thermally processed mixture to thermal reduction in a reducing atmosphere, acquiring $Li_2Ca_{1-x}SiO_4:Tb_x@M_y$ when cooled; where $0<x\leq0.2$, @ represents a coating, M is a nanoparticle core selected from at least one of Ag, Au, Pt, Pd, and Cu nanoparticles.

In one embodiment, said step of preparing a colloid containing a metal nanoparticle (M) comprises:

mixing a solution of a metal salt, an auxiliary agent and a reducing agent for a reaction time of 10 min to 45 min, and affording a colloid containing a metal nanoparticle after the reaction, said metal is at least one of Ag, Au, Pt, Pd, and Cu.

In one embodiment, the concentration of said solution of a metal salt is $1\times10^{-3}$ mol/L to $5\times10^{-2}$ mol/L;

said auxiliary agent is at least one among polyvinyl pyrrolidone, sodium citrate, cetyl trimethyl ammonium bromide, sodium lauryl sulfate and sodium dodecyl sulfate;

said auxiliary agent is present in said colloid containing a metal nanoparticle in an amount of $1\times10^{-4}$ g/mL to $5\times10^{-2}$ g/mL;

said reducing agent is at least one of hydrazine hydrate, ascorbic acid, sodium citrate and sodium borohydride;

the molar ratio of said reducing agent and the metal ion in said solution of a metal salt is 3.6: 1 to 18: 1.

In one embodiment, said step of surface processing said colloid containing a metal nanoparticle comprises adding said colloid containing a metal nanoparticle into a solution of polyvinylpyrrolidone while being stirred for 8 h to 18 h.

In one embodiment, the concentration of said solution of polyvinylpyrrolidone is 0.005 g/mL to 0.1 g/mL.

In one embodiment, said water, anhydrous ethanol, ammonia and tetraethylorthosilicate are mixed by volume fraction of 10~20: 15~50: 1~7: 0.5~3.

In one embodiment, said compounds corresponding to Li, Ca and Tb are oxides, carbonates, acetates or oxalates corresponding to Li, Ca and Tb.

In one embodiment, said thermal processing comprises calcining at 500° C. to 1000° C. for 2 h to 5 h.

In one embodiment, said step of thermal processing in a reducing atmosphere comprises conducting reduction at 800° C. to 1200° C. in a reducing atmosphere for 0.5 h to 6 h;

said reducing atmosphere is at least one among $N_2$ and $H_2$ reducing atmosphere, carbon powder reducing atmosphere, CO reducing atmosphere and pure $H_2$ reducing atmosphere.

The composition of the silicate coated metal nanoparticle luminescent material is metal nanoparticle coated with $Li_2Ca_{1-x}SiO_4:Tb_x$, all of which are substances having good chemical stability and having good stability when bombarded by large electron beams.

DETAILED DESCRIPTION OF THE EMBODIMENTS

To facilitate the understanding of the present invention, the present invention will be described in further details accompanying the drawings. The drawings give the preferable embodiment of the present invention. However, it should be understood that the detailed description of the embodiment is merely illustrative of the invention and is not to be construed limiting the invention. The present invention can be achieved in many different ways.

A luminescent material of one embodiment having the formula of $Li_2Ca_{1-x}SiO_4:Tb_x@M_y$, where, @ represents a coating, M is a nanoparticle core and is at least one of Ag, Au, Pt, Pd and Cu, $0<x\leq0.2$, y is the molar ratio between M and Si, $0<y\leq1\times10^{-2}$.

Coating is comprised of a core of a metal nanoparticle and a shell of $Li_2Ca_{1-x}SiO_4:Tb_x$ phosphor.

The composition of such luminescent material is metal nanoparticle coated with $Li_2Ca_{1-x}SiO_4:Tb_x$, all of which are substances having good chemical stability and having good stability when bombarded by large electron beams.

Figure 1:
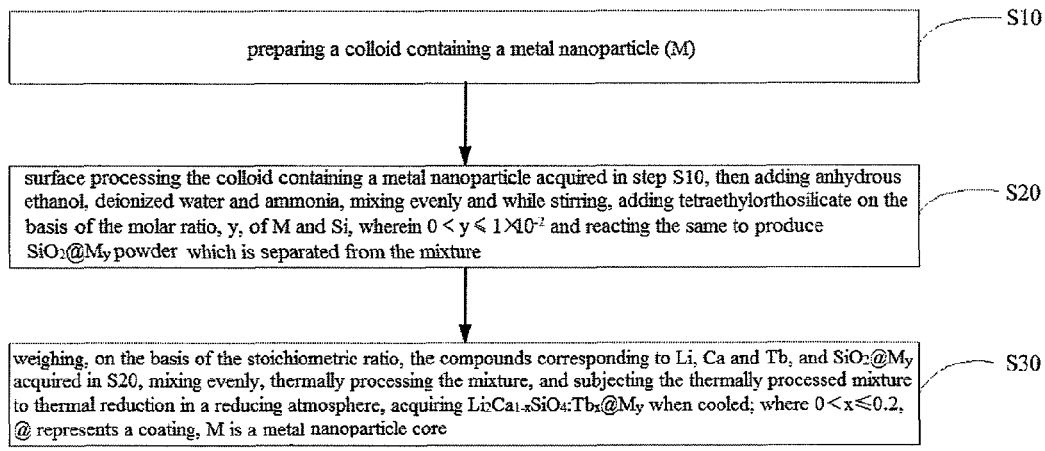
FIG. 1 shows a flowchart of the process of preparing the silicate coated metal nanoparticle luminescent material of one embodiment.

As depicted in FIG. 1, a method of preparing a silicate coated metal nanoparticle luminescent material comprises the steps of:

S10: preparation of a colloid containing a metal nanoparticle (M).

Mixing a solution of a metal salt, an auxiliary agent and a reducing agent for a reaction time of 10 min to 45 min, and affording a colloid containing a metal nanoparticle after the reaction, said metal may be at least one of Ag, Au, Pt, Pd and Cu.

A solution of a metal salt may be any soluble salts, for example, nitrate, hydrochloride, sulfate and the like. In the case of Ag and Pt, chloroauric acid ($AuCl_3HCl\cdot4H_2O$) and chloroplatinic acid ($H_2PtCl_6\cdot6H_2O$) may be used.

The concentration of said solution of a metal salt is $1\times10^{-3}$ mol/L to $5\times10^{-2}$ mol/L.

An auxiliary agent may be at least one of polyvinyl pyrrolidone, sodium citrate, cetyl trimethyl ammonium bromide, sodium lauryl sulfate and sodium dodecyl sulfate. The addition amount of an auxiliary agent in the resulting colloid containing a metal nanoparticle is $1\times10^{-4}$ g/mL to $5\times10^{-2}$ g/mL.

A reducing agent may be at least one of hydrazine hydrate, ascorbic acid, sodium citrate and sodium borohydride. A reducing agent is generally mixed with a solution of a metal salt after being formulated into a solution. A reducing agent may be formulated into or diluted to an aqueous solution having a concentration of $1\times10^{-4}$ mol/L to 1 mol/L. The molar ratio of the addition amount of a reducing agent and the metal ion in said solution of a metal salt is 3.6: 1 to 18: 1.

On the premise that a colloid containing a metal nanoparticle is acquired, to save energy, the reaction time of this step may be 10 min to 45 min.

S20: surface processing the colloid containing a metal nanoparticle acquired from step S10, then adding anhydrous ethanol, deionized water and ammonia, mixing evenly and while stirring, adding tetraethylorthosilicate on the basis of the molar ratio, y, of M and Si, wherein $0<y\leq1\times10^{-2}$ and reacting the same to produce $SiO_2@M_y$ powder which is separated from the mixture.

The step of surface processing said colloid containing a metal nanoparticle comprises adding said colloid containing a metal nanoparticle into a solution of polyvinylpyrrolidone (PVP) while being stirred for 8 h to 18 h by magnetic stirring to complete the surface processing. The concentration of said solution of polyvinylpyrrolidone is 0.005 g/mL to 0.1 g/mL.

For better formation of $SiO_2$ microspheres, water, anhydrous ethanol, ammonia and tetraethylorthosilicate are mixed by volume fraction of 10~20: 15~50: 1~7: 0.5~3.

For convenience, the $SiO_2$ coated metal nanoparticles may be referred to as $SiO_2@M_y$.

The operation of isolating the metal nanoparticles coated with $SiO_2$ may be achieved by centrifugation, washing, and drying to obtain the metal nanoparticles coated with $SiO_2$ powder.

S30: weighing, on the basis of the stoichiometric ratio, the compounds corresponding to Li, Ca and Tb, and $SiO_2@M_y$, mixing evenly, thermal processing the mixture, and subjecting the thermally processed mixture to thermal reduction in a reducing atmosphere, acquiring $Li_2Ca_{1-x}SiO_4:Tb_x@M_y$ when cooled; where $0<x\leq0.2$, @ represents a coating, and M is a metal nanoparticle core,.

Compounds corresponding to Li, Ca and Tb may be oxides, carbonates, acetates or oxalates.

The weighed compounds corresponding to Li, Ca and Tb and the thus acquired $SiO_2@M_y$ from S20 may be grinded to mix homogenously.

Said thermal processing may be conducted by calcining in a muffle furnace at 500° C. to 1000° C. for 2 h to 5 h.

Said thermal reduction may be conducted by reducing at 800° C. to 1200° C. in a reducing atmosphere for 0.5 h to 6 h.

Said reducing atmosphere may be at least one among $N_2$ and $H_2$ reducing atmosphere, carbon powder reducing atmosphere, CO reducing atmosphere and pure $H_2$ reducing atmosphere.

$SiO_2@M$ is prepared by sol-gel method, which $SiO_2@M$ being used as the silicon source is then used together with said compounds corresponding to Li, Ca and Tb to prepare the lithium calcium silicate coated metal nanoparticle phosphor, namely $Li_2Ca_{1-x}SiO_4:Tb_x@M_y$ by the high-temperature solid-phase method, by which the luminous intensity of the phosphor is enhanced.

Such luminescent material including metal nanoparticle having a coating thereon, namely terbium doped lithium calcium silicate luminescent material coated on the metal nanoparticle prepared by such method of preparing the silicate coated metal nanoparticle luminescent material has the advantages of good stability, better luminous performance, which can be widely used in the field of lighting and display.

The specific embodiment of the present invention will now be given as follows:

EXAMPLE 1

Preparation of $Li_2Ca_{0.85}SiO_4:Tb0.15@Au_{1\times10^{-2}}$

Preparation of the colloid containing the Au nanoparticle: 20.6 mg of chloroauric acid ($AuCl_3\cdot HCl\cdot4H_2O$) was weighed and dissolved in 16.8 mL of deionized water. After complete dissolution of chloroauric acid, 14 mg of sodium citrate and 6 mg of cetyl trimethyl ammonium bromide were weighed, and dissolved in an aqueous solution of chloroauric acid under magnetic stirring. 1.9 mg of sodium borohydride and 17.6 mg of ascorbic acid were, respectively, dissolved in 10 mL of deionized water to give 10 mL of an aqueous solution of sodium borohydride having a concentration of $5\times10^{-3}$ mol/L and 10 mL of an aqueous solution of ascorbic acid having a concentration of $1\times10^{-2}$ mol/L. Under magnetic stirring, 0.08 mL of the aqueous solution of sodium borohydride was firstly added into the aqueous solution of chloroauric acid, followed by addition of 3.12 mL of the aqueous solution of ascorbic acid ($1\times10^{-2}$ mol/L) into the aqueous solution of chloroauric acid after being reacted while stirring for 5 min, and the same was reacted for further 30 min to give 20 mL of a colloid containing Au nanoparticles having the Au content of $5\times10^{-3}$ mol/L.

Preparation of $SiO_2@Au_{1\times10^{-2}}$: 10 mL of a colloid containing Au nanoparticles having a concentration of $5\times10^{-3}$ mol/L was weighed. Into a beaker containing the colloid containing Au nanoparticles was added 2 mL of PVP solution (0.1 g/mL), and the same was magnetically stirred for 8 h to give surfaced-processed Au nanoparticles. Into said colloid containing Au nanoparticles was added sequentially 25 mL of anhydrous ethanol, 5 mL of ammonia, 1.2 mL of tetraethylorthosilicate under stirring, and the same was reacted for 8 h, subjected to centrifugation, washing, drying to give $SiO_2@Au_{1\times10^{-2}}$ powder.

Preparation of $Li_2Ca_{0.85}SiO_4:Tb_{0.15}@Au_{1\times10^{-2}}$: 0.1195 g of $Li_2O$, 0.1904 g of CaO, 0.1121 g of $Tb_4O_7$ and 0.2404 g of $SiO_2@Au$ powder were weighed and grinded sufficiently in an agate mortar to give a homogenous mixing, and the powder was then transferred into a corundum crucible, and subjected to thermal processing in a muffle furnace at 500° C. for 15 h, and sintered in a tubular furnace at 1000° C. in a carbon powder reducing atmosphere for 2 h to undergo reduction, cooled to room temperature to afford $Li_2Ca_{0.85}SiO_4:Tb_{0.15}@Au_{1\times10^{-2}}$ luminescent material.

EXAMPLE 2

Preparation of $Li_2Ca_{0.98}SiO_4:Tb_{0.02}@Pt_{5\times10^{-3}}$.

Preparation of the colloid containing the Pt nanoparticle: 25.9 mg of chloroplatinic acid ($H2PtCl_6.6H_2O$) was weighed and dissolved in 17 mL of deionized water. After complete dissolution of chloroplatinic acid, 40.0 mg of sodium citrate and 60.0 mg of sodium dodecylsulphate were weighed, and dissolved in an aqueous solution of chloroplatinic acid under magnetic stirring. 1.9 mg of sodium borohydride was dissolved in 10 mL of deionized water to give 10 mL of an aqueous solution of sodium borohydride having a concentration of $5\times10^{-3}$ mol/L, and 10 mL of a solution of hydrazine hydrate having a concentration of $5\times10^{-2}$ mol/L was prepared. Under magnetic stirring, 0.4 mL of the aqueous solution of sodium borohydride was firstly added dropwisely into the aqueous solution of chloroplatinic acid, followed by dropwise addition of 2.6 mL of the solution of hydrazine hydrate ($5\times10^{-2}$ mol/L) into the aqueous solution of chloroplatinic acid after being reacted while stirring for 5 min, and the same was reacted for further 40 min, to give 10 mL of a colloid containing Pt nanoparticles having the Pt content of $2.5\times10^{-3}$ mol/L.

Preparation of $SiO_2@Pt_{5\times10^{-3}}$: 8 mL of a colloid containing Pt nanoparticles ($2.5\times10^{-3}$ mol/L) was weighed. Into a beaker containing the colloid containing Pt nanoparticles was added 4 mL of PVP solution (0.02 g/mL), and the same was magnetically stirred for 18 h, to give surfaced-processed Pt nanoparticles. Into said colloid containing Pt nanoparticles was added sequentially 20 mL of anhydrous ethanol, 4 mL of ammonia, 1 mL of tetraethylorthosilicate under stirring, and the same was reacted for 3 h, subjected to centrifugation, washing, drying to give $SiO_2@Pt_{5\times10^{-3}}$ powder.

Preparation of $Li_2Ca_{0.98}SiO_4:Tb_{0.02}@Pt_{5\times10^{-3}}$: 0.2955 g of $Li_2CO_3$, 0.3924 g of $CaCO_3$, 0.0199 g of $Tb_2(CO_3)_3$ and 0.2404 g of $SiO_2@Au$ powder were weighed and grinded sufficiently in an agate mortar to give a homogenous mixing, and the powder was then transferred into a corundum crucible, and subjected to thermal processing in a muffle furnace at 1000° C. for 2 h, and sintered in a tubular furnace at 1200° C. in a CO reducing atmosphere for 0.5 h to undergo reduction, cooled to room temperature, to afford $Li_2Ca_{0.98}SiO_4:Tb_{0.02}@Pt_{5\times10^{-3}}$ luminescent material.

EXAMPLE 3

Preparation of $Li_2Ca_{0.90}SiO_4:Tb_{0.10}@Ag_{2.5\times10^{-4}}$.

Preparation of the colloid containing the Ag nanoparticle: 3.4 mg of silver nitrate ($AgNO_3$) was weighed and dissolved in 18.4 mL of deionized water. After complete dissolution of silver nitrate, 42 mg of sodium citrate was weighed, and dissolved in an aqueous solution of silver nitrate under magnetic stirring. 5.7 mg of sodium borohydride was dissolved in 10mL of deionized water to give 10 mL of an aqueous solution of sodium borohydride having a concentration of $1.5\times10^{-2}$ mol/L. Under magnetic stirring, 1.6 mL of the aqueous solution of sodium borohydride ($1.5\times10^{-2}$ mol/L) was added all at once into the aqueous solution of silver nitrate, and the same was reacted for further 10 min, to give 20 mL of a colloid containing Ag nanoparticles having the Ag content of $1\times10^{-3}$ mol/L.

Preparation of $SiO_2@Ag_{2.5\times10^{-4}}$: 1.2 mL of a colloid containing Ag nanoparticles ($1\times10^{-3}$ mol/L) was weighed. Into a beaker containing the colloid containing Ag nanoparticles was added 10 mL of PVP solution (0.01 g/mL), and the same was magnetically stirred for 12 h, to give surfaced-processed Ag nanoparticles. Into said colloid containing Ag nanoparticles was added sequentially 30 mL of anhydrous ethanol, 7.2 mL of ammonia, 1.2 mL of tetraethylorthosilicate under stirring, and the same was reacted for 6 h, subjected to centrifugation, washing, drying to give $SiO_2@Ag_{2.5\times10^{-4}}$ powder.

Preparation of $Li_2Ca_{0.90}SiO_4:Tb_{0.10}@Ag_{2.5\times10^{-4}}$: 0.2955 g of $Li_2CO_3$, 0.2016 g of CaO, 0.0747 g of $Tb_4O_7$ and 0.2404 g of $SiO_2$ of $SiO_2@Au$ powder were weighed and grinded sufficiently in an agate mortar to give a homogenous mixing, and the powder was then transferred into a corundum crucible, and subjected to thermal processing in a muffle furnace at 600° C. for 4 h, and sintered in a tubular furnace at 800° C. in a 95% $N_2$+5%$H_2$ weak reducing atmosphere for 6h to undergo reduction, cooled to room temperature, to afford $Li_2Ca_{0.90}SiO_4:Tb_{0.10}@Ag_{2.5\times10^{-4}}$ luminescent material.

Figure 2:
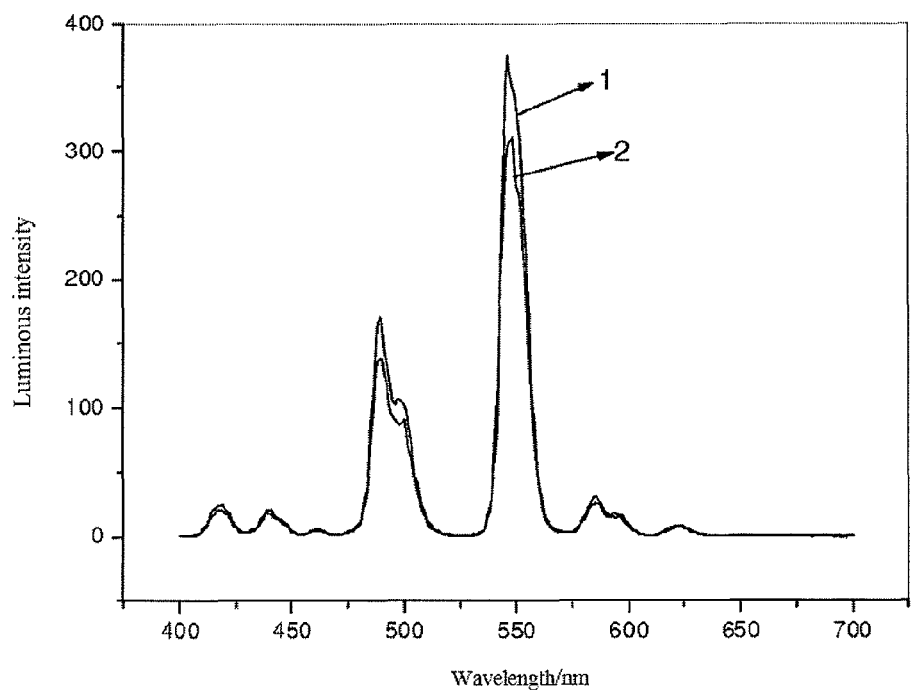
FIG. 2 shows a comparative plot of the luminescent spectrum of the silicate coated metal nanoparticle luminescent material prepared in Example 3 and that of the traditional luminescent material having the formula of $Li_2Ca_{0.90}SiO_4:Tb_{0.10}$ without being coated on metal nanoparticles, being excited with a cathode ray at an accelerating voltage of 1.5 kV.

FIG. 2 is a comparative plot of the luminescent spectrum of the $Li_2Ca_{0.90}SiO_4:Tb_{0.10}@Ag_{2.5\times10^{-4}}$ luminescent material coated therein Ag nanoparticle prepared in this Example and that of the traditional $Li_2Ca_{0.90}SiO_4:Tb_{0.10}$ luminescent material without coated therein metal nanoparticles, being excited with a cathode ray at a voltage of 1.5 kV. Curve 1 is the luminescent spectrum of the $Li_2Ca_{0.90}SiO_4:Tb_{0.10}@Ag_{2.5\times10^{-4}}$ luminescent material coated therein Ag nanoparticle, while curve 2 is the luminescent spectrum of the $Li_2Ca_{0.90}SiO_4:Tb_{0.10}$ luminescent material without coated therein metal nanoparticles. FIG. 2 shows that the luminous intensity of $Li_2Ca_{0.90}SiO_4:Tb_{0.10}@Ag_{2.5\times10^{-4}}$ coated therein Ag nanoparticle has an increasement of 20% as comparing with the commercial available $Li_2Ca_{0.90}SiO_4:Tb_{0.10}$ luminescent material without coated therein metal nanoparticles at the emission peak of 544 nm.

The luminescent material of the present Example has good stability, good color purity and higher luminous efficiency.

EXAMPLE 4

Preparation of $Li_2Ca_{0.80}SiO_4:Tb_{0.20}@Pd_{1\times10^{-5}}$.

Preparation of the colloid containing the Pd nanoparticle: 0.22 mg of palladium chloride ($PdCl_2.2H_2O$) was weighed and dissolved in 19 mL of deionized water. After complete dissolution of palladium chloride, 11.0 mg of sodium citrate and 4.0 mg of lauryl sodium sulfate were weighed, and dissolved in an aqueous solution of palladium chloride under magnetic stirring. 3.8 mg of sodium borohydride was dissolved in 10 mL of deionized water to give a reducing solution of sodium borohydride having a concentration of $1\times10^{-2}$ mol/L; under magnetic stirring, 1 mL of the aqueous solution of sodium borohydride ($1\times10^{-2}$ mol/L) was added rapidly into the aqueous solution of palladium chloride, and the same was reacted for further 20 min, to give 20 mL of a colloid containing Pd nanoparticles having the Pd content of $5\times10^{-5}$ mol/L.

Preparation of $SiO_2@Pd_{1\times10^{-5}}$: 1.5 mL of a colloid containing Pd nanoparticles ($5\times10^{-5}$ mol/L) was weighed. Into a beaker containing the colloid containing Pd nanoparticles was added 8 mL of PVP solution (0.005 g/mL), and the same was magnetically stirred for 16 h, to give surfaced-processed Pd nanoparticles. Into said colloid containing Pd nanoparticles was added sequentially 40 mL of anhydrous ethanol, 8 mL of ammonia, 1.8 mL of tetraethylorthosilicate under stirring, and the same was reacted for 5 h, subjected to centrifugation, washing, drying to give $SiO_2@Pd_{1\times10^{-5}}$ powder.

Preparation of $Li_2Ca_{0.80}SiO_4:Tb_{0.20}@Pd_{1\times10^{-5}}$: 0.4076 g of $Li_2C_2O_4$, 0.4096 g of $CaC_2O_4$, 0.2327 g of $Tb_2(C_2O_4)_3$ and 0.2404 g of $SiO_2$ of $SiO2@Pd$ powder were weighed and grinded sufficiently in an agate mortar to give a homogenous mixing, and the powder was then transferred into a corundum crucible, and subjected to thermal processing in a muffle furnace at 700° C. for 5 h, and sintered in a tubular furnace at 1000° C. in a 95% $N_2+5\%H_2$ weak reducing atmosphere for 6 h to undergo reduction, cooled to room temperature, to afford $Li_2Ca_{0.80}SiO_4:Tb_{0.20}@Pd_{1\times10^{-5}}$ luminescent material.

EXAMPLE 5

Preparation of $Li_2Ca_{0.95}SiO_4:Tb_{0.05}@Cu_{1\times10^{-4}}$.

Preparation of the colloid containing the Cu nanoparticle: 1.6 mg of copper nitrate was weighed and dissolved in 16 mL of ethanol. After complete dissolution, 12 mg of PVP was added under stirring, followed by dropwisely added therein 4 ml of an ethanol solution of sodium borohydride ($1\times10^{-3}$ mol/L) obtained by dissolving 0.4 mg of sodium borohydride in 10 mL of ethanol, and the same was reacted for further 10 min, to give 20 mL of a colloid containing Cu nanoparticles ($4\times10^{-4}$ mol/L).

Preparation of $SiO_2@Cu_{1\times10^{-4}}$: 1.5 mL of a colloid containing Cu nanoparticles ($4\times10^{-4}$ mol/L) was weighed. Into a beaker containing the colloid containing Cu nanoparticles was added 5 mL of PVP solution (0.03 g/mL), and the same was magnetically stirred for 10 h, to give surfaced-processed Cu nanoparticles. Into said colloid containing Cu nanoparticles was added sequentially 15 mL of anhydrous ethanol, 3 mL of ammonia, 1.4 mL of tetraethylorthosilicate under stirring, and the same was reacted for 4 h, subjected to centrifugation, washing, drying to give $SiO_2@Cu_{1\times10^{-4}}$ powder.

Preparation of $Li_2Ca_{0.95}SiO_4:Tb_{0.05}@Cu_{1\times10^{-4}}$: 0.5516 g of $LiNO_3$, 0.6232 g of $Ca(NO_3)_2$, 0.0689 g of $Tb(NO_3)_3$ and 0.2404 g of $SiO_2$ of $SiO_2@Pd$ powder were weighed and grinded sufficiently in an agate mortar to give a homogenous mixing, and the powder was then transferred into a corundum crucible, and subjected to thermal processing in a muffle furnace at 600° C. for 4 h, and sintered in a tubular furnace at 1000° C. in a 95% $N_2+5\%H_2$ weak reducing atmosphere for 6 h to undergo reduction, cooled to room temperature, to afford $Li_2Ca_{0.80}SiO_4:Tb_{0.20}@Pd_{1\times10^{-5}}$ luminescent material.

EXAMPLE 6

Preparation of $Li_2Ca_{0.88}SiO_4:Tb_{0.12}@Ag_{5\times10^{-4}}$.

Preparation of the colloid containing the Ag nanoparticle: 0.0429 g of $AgNO_3$, 0.0733 g of sodium citrate and 0.05 g of PVP were respectively weighed, and formulated into 10 mL of an aqueous solution of $AgNO_3$ (0.025 mol/L), 10 mL of an aqueous solution of sodium citrate (0.025 mol/L) and 10 mL of an aqueous solution of PVP (5 mg/mL). 2 mL of the aqueous solution of $AgNO_3$ was taken and added into 30 mL of deionized water, and simultaneously added therein 4 mL of the aqueous solution of PVP under stirring, and the same was heated to 100° C., followed by dropwisely added therein 4 mL of an aqueous solution of sodium citrate, and the same was reacted for further 15 min to give 40 mL of a colloid containing Ag nanoparticles ($1\times10^{-3}$ mol/L).

Preparation of $SiO_2@Ag_{5\times10^{-4}}$: 5 mL of a colloid containing Ag nanoparticles ($1\times10^{-3}$ mol/L) was weighed. Into a beaker containing the colloid containing Ag nanoparticles was added 6 mL of PVP solution (0.06 g/mL), and the same was magnetically stirred for 15 h give surfaced-processed Ag nanoparticles. Into said colloid containing Ag nanoparticles was added sequentially 35 mL of anhydrous ethanol, 8 mL of ammonia, 1.5 mL of tetraethylorthosilicate under stirring, and the same was reacted for 2 h, subjected to centrifugation, washing, drying to give $SiO_2@Ag_{5\times10^{-4}}$ powder.

Preparation of $Li_2Ca_{0.88}SiO_4:Tb_{0.12}@Ag_{5\times10^{-4}}$: 0.2955 g of $Li_2CO_3$, 0.4506 g of $CaC_2O_4$, 0.1396 g of $Tb_2(C_2O_4)_3$ and 0.2404 g of $SiO_2$ of $SiO_2@Pd$ powder were weighed and grinded sufficiently in an agate mortar to give a homogenous mixing, and the powder was then transferred into a corundum crucible, and subjected to thermal processing in a muffle furnace at 500° C. for 10 h, and sintered in a tubular furnace at 1100° C. in a pure $H_2$ reducing atmosphere for 3 h to undergo reduction, cooled to room temperature to afford $Li_2Ca_{0.80}SiO_4:Tb_{0.20}@Pd_{1\times10^{-5}}$ luminescent material.

EXAMPLE 7

Preparation of $Li_2Ca_{0.92}SiO_4:Tb_{0.08}@(Ag_{0.5}/Au_{0.5})_{1.25\times10^{-3}}$.

Preparation of the colloid containing the $Ag_{0.5}/Au_{0.5}$ nanoparticle: 6.2 mg of chloroauric acid ($AuCl_3 \cdot HCl \cdot 4H_2O$) and 2.5 mg of $AgNO_3$ were weighed, and dissolved in 28 mL of deionized water. After complete dissolution, 22 mg of sodium citrate and 20 mg of PVP were weighed, and dissolved in the above mixed solution under magnetic stirring. 5.7 mg of sodium borohydride was weighed and dissolved in 10 mL of deionized water to give 10 mL of an aqueous solution sodium borohydride having a concentration of $1.5\times10^{-2}$ mol/L. Under magnetic stirring, into the above mixed solution was added all at once 2 mL of an aqueous solution of sodium borohydride ($1.5\times10^{-2}$ mol/L), and the same was further reacted for 20 min to afford 30 mL of colloid containing Ag/Au nanoparticles having a total metal concentration of $1\times10^{-3}$ mol/L.

Preparation of $SiO_2@(Ag_{0.5}/Au_{0.5})_{1.25\times10^{-3}}$: 5 mL of a colloid containing $Ag_{0.5}/Au_{0.5}$ nanoparticles ($1\times10^{-3}$ mol/L) was weighed. Into a beaker containing the colloid containing $Ag_{0.5}/Au_{0.5}$ nanoparticles was added 10 mL of PVP solution (0.1 g/mL), and the same was magnetically stirred for 12 h, to give surfaced-processed $Ag_{0.5}/Au_{0.5}$ nanoparticles. Into said colloid containing $Ag_{0.5}/Au_{0.5}$ nanoparticles was added sequentially 30 mL of anhydrous ethanol, 6 mL of ammonia, 1 mL of tetraethylorthosilicate under stirring, and the same was reacted for 5 h, subjected to centrifugation, washing, drying to give $SiO_2@(Ag_{0.5}/Au_{0.5})_{1.25\times10^{-3}}$ powder.

Preparation of $Li_2Ca_{0.92}SiO_4:Tb_{0.08}@(Ag_{0.5}/Au_{0.5})_{1.25\times10^{-3}}$: 0.2955 g of $Li_2CO_3$, 0.2016 g of CaO, 0.0747 g of $Tb_4O_7$ and 0.2404 g of $SiO_2@(Ag_{0.5}/Au_{0.5})_{1.25\times10^{-3}}$ powder were weighed and grinded sufficiently in an agate mortar to give a homogenous mixing, and the powder was then transferred into a corundum crucible, and subjected to thermal processing in a muffle furnace at 700° C. for 8 h, and sintered in a tubular furnace at 900° C. in 95%$N_2$+5% $H_2$ weak reducing atmosphere for 5 h to undergo reduction, cooled to room temperature, to afford $Li_2Ca_{0.92}SiO_4:Tb_{0.08}@(Ag_{0.5}/Au_{0.5})_{1.25\times10^{-3}}$ luminescent material.

Although the preferable embodiments of the present invention have been described and illustrated in detail, it is clearly understood that the same are not to be taken by way of limitation, it should be understood that various changes, substitutions, and alterations could be made hereto by an ordinary skilled person in the art without departing from the spirit and scope of the invention as defined by the appended claims.

What is claimed is:

1. A luminescent material having the molecular formula of: $Li_2Ca_{1-x}SiO_4:Tb_x@M_y$;
    wherein @ represents a coating, M is a metal nanoparticle core and is at least one of Ag, Au, Pt, Pd, and Cu, $0<x\leq0.2$, y is the molar ratio of M and Si, $0<y\leq1\times10^{-2}$.

2. A method of preparing a luminescent material, comprising the steps of:
    preparing a colloid containing a metal nanoparticle (M), wherein said metal nanoparticle is at least one of Ag, Au, Pt, Pd, and Cu;
    surface processing said colloid containing a metal nanoparticle, then adding anhydrous ethanol, deionized water and ammonia, mixing evenly and while stirring, adding tetraethylorthosilicate on the basis of the molar ratio, y, of M and Si, wherein $0<y\leq1\times10^{-2}$ and reacting the same to produce $SiO_2@M_y$ powder which is separated from the mixture;
    weighing, on the basis of the stoichiometric ratio, the compounds corresponding to Li, Ca and Tb, and $SiO_2@M_y$, mixing evenly, thermally processing the mixture, and
    subjecting the thermally processed mixture to thermal reduction in a reducing atmosphere, acquiring $Li_2Ca_{1-x}SiO_4:Tb_x@M_y$ when cooled; where $0<x\leq0.2$, @ represents a coating, M is a nanoparticle core selected from at least one among of Ag, Au, Pt, Pd, and Cu nanoparticles.

3. A method of preparing a luminescent material according to claim 2, wherein, said step of preparing a colloid containing a metal nanoparticle comprises mixing a solution of a metal salt, an auxiliary agent and a reducing agent for a reaction time of 10 min to 45 min, and producing a colloid containing a metal nanoparticle after the reaction, said metal is at least one among Ag, Au, Pt, Pd, and Cu.

4. A method of preparing a luminescent material according to claim 3, wherein, the concentration of said solution of a metal salt is $1\times10^{-3}$ mol/L to $5\times10^{-2}$ mol/L;
    said auxiliary agent is at least one of polyvinyl pyrrolidone, sodium citrate, cetyl trimethyl ammonium bromide, sodium lauryl sulfate and sodium dodecyl sulfate;
    said auxiliary agent is present in said colloid containing a metal nanoparticle in an amount of $1\times10^{-4}$ g/mL to $5\times10^{-2}$ g/mL;
    said reducing agent is at least one among hydrazine hydrate, ascorbic acid, sodium citrate and sodium borohydride;
    the molar ratio of said reducing agent and the metal ion in said solution of a metal salt is 3.6:1 to 18:1.

5. A method of preparing luminescent material according to claim 2, wherein, said step of surface processing said colloid containing a metal nanoparticle comprises adding said colloid containing a metal nanoparticle into a solution of polyvinylpyrrolidone while being stirred for 8 h to 18 h.

6. A method of preparing a luminescent material according to claim 5, wherein, the concentration of said solution of polyvinylpyrrolidone is 0.005 g/mL to 0.1 g/mL.

7. A method of preparing a luminescent material according to claim 2, wherein, said water, anhydrous ethanol, ammonia and tetraethylorthosilicate are mixed by volume fraction of 10~20: 15~50: 1~7: 0.5~3.

8. A method of preparing a luminescent material according to claim 2, wherein, said compounds corresponding to Li, Ca and Tb are oxides, carbonates, acetates or oxalates corresponding to Li, Ca and Tb.

9. A method of preparing a luminescent material according to claim 2, wherein, said thermal processing comprises calcining at 500° C. to 1000° C. for 2 h to 5 h.

10. A method of preparing a luminescent material according to claim 2, wherein, said step of subjecting to thermal reduction in a reducing atmosphere comprises conducting reduction in a reducing atmosphere at 800° C. to 1200° C. for 0.5 h to 6 h; said reducing atmosphere is at least one of $N_2$ and $H_2$ reducing atmosphere, carbon powder reducing atmosphere, CO reducing atmosphere and pure $H_2$ reducing atmosphere.

* * * * *